(12) United States Patent
McMahon et al.

(10) Patent No.: US 10,533,425 B2
(45) Date of Patent: Jan. 14, 2020

(54) DOUBLET VANE ASSEMBLY FOR A GAS TURBINE ENGINE

(71) Applicant: United Technologies Corporation, Farmington, CT (US)

(72) Inventors: Shawn M. McMahon, West Hartford, CT (US); Christopher Whitfield, Manchester, CT (US); Nicholas M. LoRicco, Windsor, CT (US); Steven Bruce Gautschi, Milton, MA (US); Vincent E. Simms, Bloomfield, CT (US); Justin M. Aniello, Ellington, CT (US); Thomas Allwood, Manchester, CT (US); Richard M. Salzillo, Plantsville, CT (US); Jeffery Scott Hembree, Sr., Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 116 days.

(21) Appl. No.: 15/856,182

(22) Filed: Dec. 28, 2017

(65) Prior Publication Data

US 2019/0203602 A1    Jul. 4, 2019

(51) Int. Cl.
*F01D 5/18*    (2006.01)
*F01D 9/04*    (2006.01)

(52) U.S. Cl.
CPC .............. *F01D 5/186* (2013.01); *F01D 9/041* (2013.01); *F05D 2240/12* (2013.01); *F05D 2240/81* (2013.01); *F05D 2260/202* (2013.01)

(58) Field of Classification Search
CPC . F01D 5/18; F01D 5/186; F01D 9/041; F01D 11/08; F01D 25/12; F04D 29/542;
(Continued)

(56) References Cited

U.S. PATENT DOCUMENTS

| 6,732,910 B2 | 5/2004 | Benedetti et al. |
| 8,403,632 B2 | 3/2013 | Surace et al. |

(Continued)

FOREIGN PATENT DOCUMENTS

| JP | 2010276010 | 12/2010 |
| WO | 2011157549 | 12/2011 |
| WO | 2015026598 | 2/2015 |

OTHER PUBLICATIONS

European Search report for Application No. EP 18214959.1 dated May 24, 2019.

*Primary Examiner* — Igor Kershteyn
(74) *Attorney, Agent, or Firm* — Carlson, Gaskey & Olds, P.C.

(57) ABSTRACT

A vane assembly for a gas turbine engine includes an inner diameter platform, an outer diameter platform, and an airfoil shaped vane spanning from the inner diameter platform to the outer diameter platform. The airfoil shaped vane includes an internal cooling passage having a first inlet at the inner diameter platform and a second inlet at the outer diameter platform. An outer diameter platform cover is disposed radially outward of the outer diameter platform, relative to a radius of an arc defined by an arc of the outer diameter platform. The outer diameter platform includes at least one coolant cover inlet hole, the at least one coolant cover inlet hole being aligned with a corresponding second inlet.

16 Claims, 3 Drawing Sheets

(58) Field of Classification Search
CPC .............. F04D 29/582; F05D 2220/32; F05D 2240/12; F05D 2240/81; F05D 2250/11
See application file for complete search history.

(56) References Cited

U.S. PATENT DOCUMENTS

| | | |
|---|---|---|
| 8,777,570 B1 | 7/2014 | Liang |
| 9,845,694 B2 | 12/2017 | Hagan et al. |
| 2013/0209217 A1* | 8/2013 | Butler ..................... F01D 9/041 415/1 |
| 2016/0194980 A1* | 7/2016 | Thomen ................ F04D 29/542 415/1 |
| 2016/0312632 A1* | 10/2016 | Hagan .................... F01D 9/041 |

* cited by examiner

DOUBLET VANE ASSEMBLY FOR A GAS TURBINE ENGINE

TECHNICAL FIELD

The present disclosure relates generally to a vane assembly for a gas turbine engine, and more specifically to a vane assembly including features for radially outward and radially inward provision of cooling air to an internal cooling passage of a vane.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

As gas turbine engine architectures have achieved higher efficiencies, corresponding increases in turbine and combustor temperatures have occurred. As a result, active cooling of flowpath components (e.g. vanes) within the turbine section has been incorporated into modern engine designs.

SUMMARY OF THE INVENTION

In one exemplary embodiment a vane assembly for a gas turbine engine includes an inner diameter platform, an outer diameter platform, an airfoil shaped vane spanning from the inner diameter platform to the outer diameter platform, the airfoil shaped vane including an internal cooling passage having a first inlet at the inner diameter platform and a second inlet at the outer diameter platform, and an outer diameter platform cover disposed radially outward of the outer diameter platform, relative to a radius of an arc defined by an arc of the outer diameter platform, the outer diameter platform including at least one coolant cover inlet hole, the at least one coolant cover inlet hole being aligned with a corresponding second inlet.

In another example of the above described vane assembly for a gas turbine engine a cross sectional shape of the second inlet and a cross sectional shape of the at least one cooling cover inlet hole is the same.

In another example of any of the above described vane assemblies for a gas turbine engine the cross sectional shape of the at least one cooling cover inlet hole is scaled down relative to the cross sectional shape of the second inlet by a scaling factor.

In another example of any of the above described vane assemblies for a gas turbine engine the scaling factor is at least 39%.

Another example of any of the above described vane assemblies for a gas turbine engine further includes a baffle plate disposed between the outer diameter platform and the outer diameter platform cover.

In another example of any of the above described vane assemblies for a gas turbine engine the baffle plate includes at least one baffle plate inlet hole, the at least one baffle plate inlet hole being aligned with a corresponding second inlet and a corresponding coolant cover inlet.

In another example of any of the above described vane assemblies for a gas turbine engine the baffle plate inlet hole is identically sized with the corresponding coolant cover inlet.

In another example of any of the above described vane assemblies for a gas turbine engine the baffle plate inlet hole is identically shaped with the corresponding coolant cover inlet.

Another example of any of the above described vane assemblies for a gas turbine engine further includes a second vane spanning from the inner diameter platform to the outer diameter platform, the second vane being substantially identical to the airfoil shaped vane.

In another example of any of the above described vane assemblies for a gas turbine engine the at least one coolant cover inlet hole includes a first coolant cover inlet corresponding to the second inlet of the airfoil shaped vane, and a second coolant cover inlet corresponding to the second inlet of the second vane.

In another example of any of the above described vane assemblies for a gas turbine engine the airfoil shaped vane includes a plurality of film cooling holes configured as coolant outlets for the internal coolant passage.

In another example of any of the above described vane assemblies for a gas turbine engine the vane assembly is a first stage turbine vane assembly for a gas turbine engine.

An exemplary method for improving a vane assembly includes creating at least a first coolant cover inlet hole in an outer diameter platform cover of a vane assembly, the first coolant cover inlet hole being aligned with a corresponding first airfoil inlet, and the vane assembly including an inner diameter platform, an outer diameter platform, an airfoil shaped vane spanning from the inner diameter platform to the outer diameter platform, the airfoil shaped vane including an internal cooling passage having a first inlet at the outer diameter platform and a second inlet at the inner diameter platform, and the outer diameter platform cover being disposed radially outward of the outer diameter platform, relative to a radius of an arc defined by an arc of the outer diameter platform.

In another example of the above described exemplary method for improving a vane assembly creating the first coolant cover inlet hole in the outer diameter platform cover of the vane assembly further includes creating a first baffle plate inlet hole in a corresponding baffle plate.

In another example of any of the above described exemplary methods for improving a vane assembly creating the first coolant cover inlet hole and the first baffle plate inlet hole is performed in a single material removal operation.

Another example of any of the above described exemplary methods for improving a vane assembly further includes creating a second coolant cover inlet hole in the outer diameter platform cover of the vane assembly, the second coolant cover inlet hole being aligned with the corresponding first airfoil inlet.

In another example of any of the above described exemplary methods for improving a vane assembly the first cooling cover inlet hole is the same shape as the first airfoil inlet.

In another example of any of the above described exemplary methods for improving a vane assembly a size of the first cooling cover inlet hole is scaled relative to a size of the first airfoil inlet such that the first cooling cover inlet hole is smaller than the first airfoil inlet.

These and other features of the present invention can be best understood from the following specification and drawings, the following of which is a brief description.

BRIEF DESCRIPTION OF THE DRAWINGS

The disclosure can be further understood by reference to the following detailed description when considered in connection with the accompanying drawings wherein.

DETAILED DESCRIPTION OF AN EMBODIMENT

Figure 1:
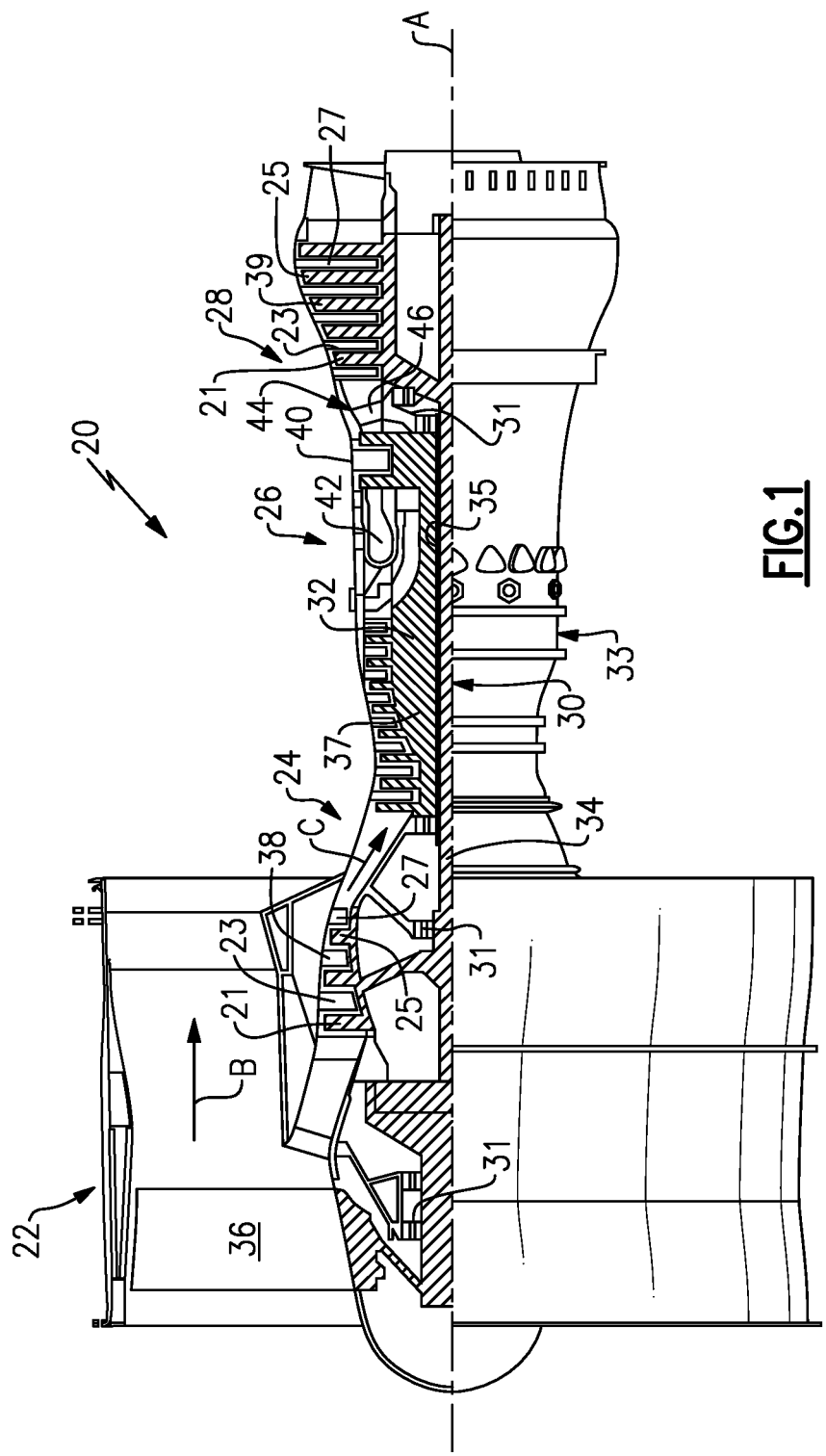
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that additional bearing systems 31 may alternatively or additionally be provided.

The low speed spool 30 generally includes an inner shaft 34 that interconnects a fan 36, a low pressure compressor 38 and a low pressure turbine 39. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 supports one or more bearing systems 31 of the turbine section 28. The mid-turbine frame 44 may include one or more airfoils 46 that may be positioned within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

In some non-limiting examples, the gas turbine engine 20 is a high-bypass geared aircraft engine. In a further example, the gas turbine engine 20 bypass ratio is greater than about six (6:1). The example gas turbine engine 20 can be a geared turbofan engine that includes an epicyclic gear train, such as a planetary gear system or other gear system. The example epicyclic gear train has a gear reduction ratio of greater than about 2.3, and in another example is greater than about 2.5:1. The geared turbofan enables operation of the low speed spool 30 at higher speeds which can increase the operational efficiency of the low pressure compressor 38 and low pressure turbine 39 and render increased pressure in a fewer number of stages.

The low pressure turbine 39 pressure ratio is pressure measured prior to the inlet of the low pressure turbine 39 as related to the pressure at the outlet of the low pressure turbine 39 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about 5 (5:1). It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.55. In another non-limiting embodiment the low fan pressure ratio is less than about 1.45. In another non-limiting embodiment the low fan pressure ratio is from 1.1 to 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Each of the compressor section 24 and the turbine section 28 may include alternating rows of rotor assemblies and vane assemblies (shown schematically) that carry one or more airfoils that may extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from core airflow that is communicated through the gas turbine engine 20. The vanes 27 of the vane assemblies direct core airflow to the blades 25 of the rotor assemblies to either add or extract energy.

Various components of the gas turbine engine 20, including airfoils of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require airfoil cooling arrangements for cooling the airfoils or other flowpath components that extend into the core flow path C. Exemplary airfoil cooling arrangements that include internal cooling circuits and film cooling holes are described herein.

Figure 3:
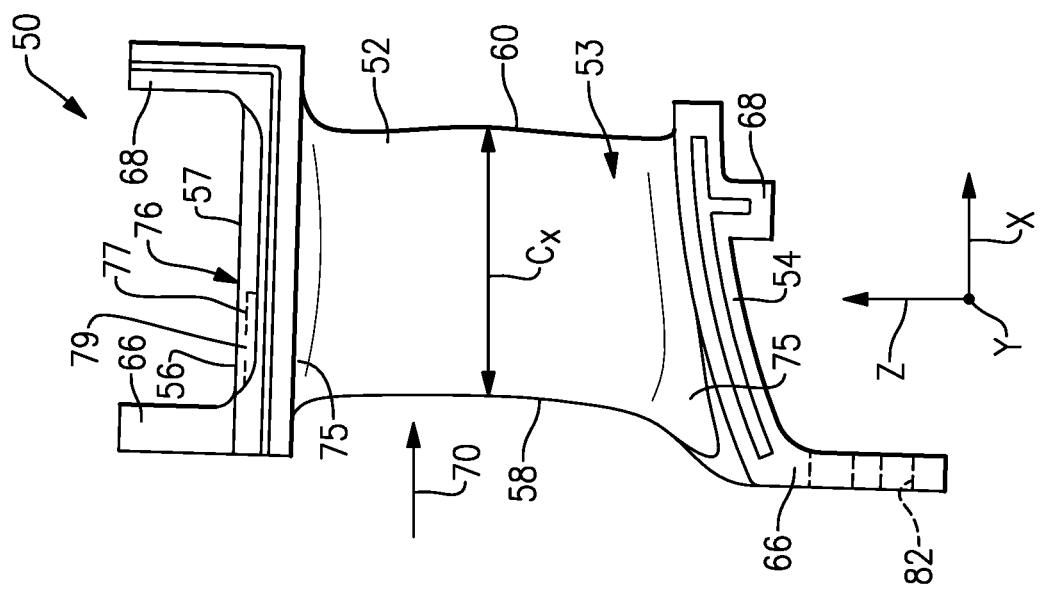
FIG. 3 schematically illustrates another view of the vane of FIG. 2.
Figure 2:
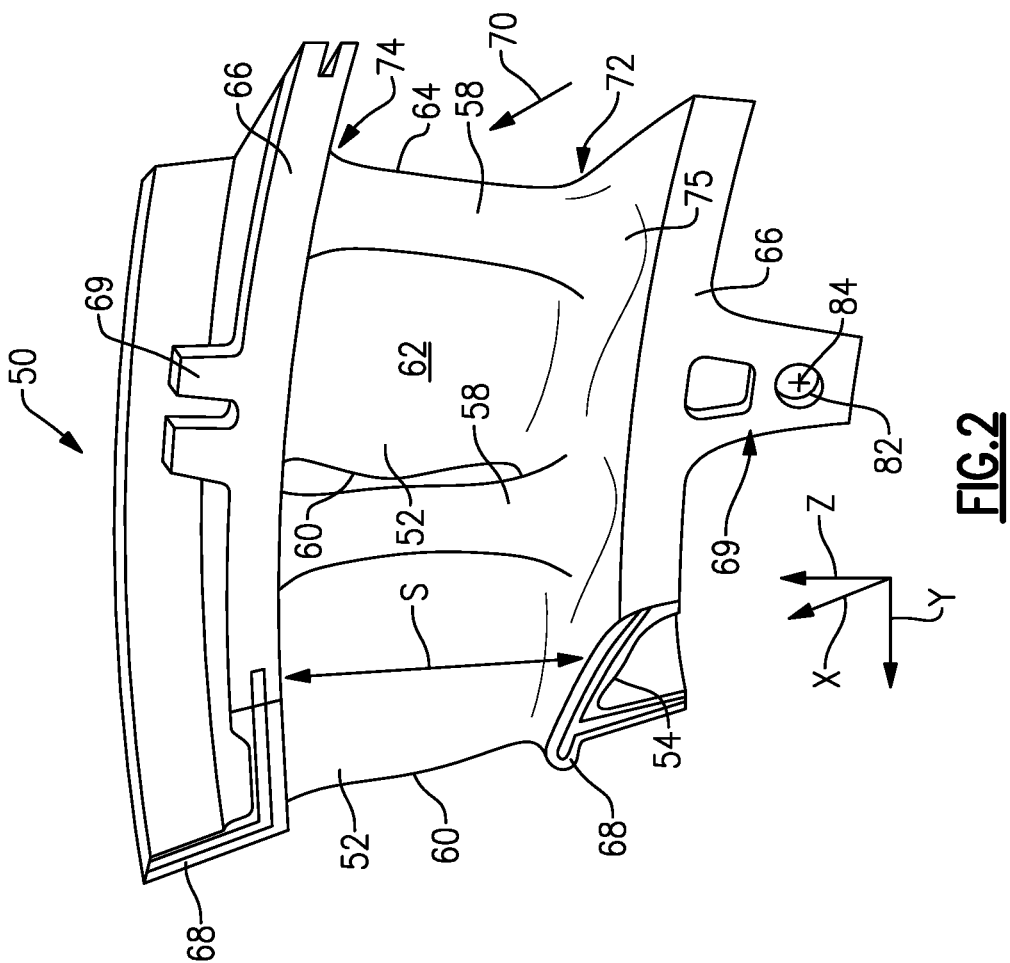
FIG. 2 schematically illustrates a doublet stator vane that can be incorporated into a gas turbine engine.

FIGS. 2 and 3 illustrate an exemplary doublet stator vane 50 that may be incorporated into a gas turbine engine, such as the gas turbine engine 20. A "doublet" includes a pair of airfoils joined to the same inner and outer platforms. The vane 50 of this particular embodiment is a first stage turbine vane of the turbine section 28. However, this disclosure is not limited to this particular vane and could extend to any vane that is disposed within the core flow path C of the gas turbine engine 20. Further, this disclosure extends to similarly arranged singlets or triplets, and is not limited to the illustrated doublet configuration.

The vane 50 includes two airfoils 52 that extend between an inner platform 54 (on an inner diameter side) and an outer platform 56 (on an outer diameter side). Each airfoil 52 includes a leading edge 58, a trailing edge 60, a pressure side 62 and a suction side 64. Each airfoil 52, including the pressure side 62 and the suction side 64, extends in chord Cx between the leading edge 58 and the trailing edge 60 and extends in span S between the inner platform 54 and the outer platform 56. An outer diameter platform cover 76 is disposed radially outward of a base portion of the outer diameter platform 56 and defines a cavity 57. In order to facilitate provision of cooling air from the radially outward platform 54 to the internal cooling passages, the cover 76 can include openings corresponding to an airfoil inlet to the internal cooling passage of each airfoil 52. This configuration is illustrated, and described in more detail, with regards to FIG. 4.

A gas path 70 is communicated axially downstream through the gas turbine engine 20 in a direction that extends from the leading edge 58 toward the trailing edge 60 of the airfoil 52. The gas path 70 (for the communication of core airfoil along the core flow path C) extends between an inner gas path 72 associated with the inner platform 54 and an outer gas path 74 associated with the outer platform 56 of the vane 50. The inner platform 54 and the outer platform 56 are connected to the airfoils 52 at the inner and outer gas paths 72, 74 via fillets 75.

Both the inner platform 54 and the outer platform 56 include leading edge rails 66 and trailing edge rails 68 having one or more engagement features 69 for mounting the vane 50 to the gas turbine engine 20, such as to an engine casing. Other engagement feature configurations are contemplated as within the scope of this disclosure, including but not limited to, hooks, rails, bolts, rivets, tabs and/or other features that can be incorporated into the vane 50 to retain the vane 50 to the gas turbine engine 20. In this exemplary embodiment, the leading edge rail 66 of the inner platform 54 includes a pin hole 82 having a center point 84 (See FIG. 2).

Each of the airfoils 52 includes internal cooling passages that receive cooling air from one or both of the outer diameter platform 56 or the inner diameter platform 54. Cooling air is provided from the inner diameter platform 54 to the internal cooling passages through any known connection. Similarly, cooling air is provided to the internal cooling passages from the outer diameter platform 54 through the cover 76, as well as through any other known connection. Internal to the cavity 57, and between the cover 76 and the inner diameter platform, a baffle plate 77 can be disposed.

The baffle plate further facilitates the distribution of cooling air to the outer diameter platform 56 as well as into the internal cooling passages of the airfoils 52.

Figure 4:
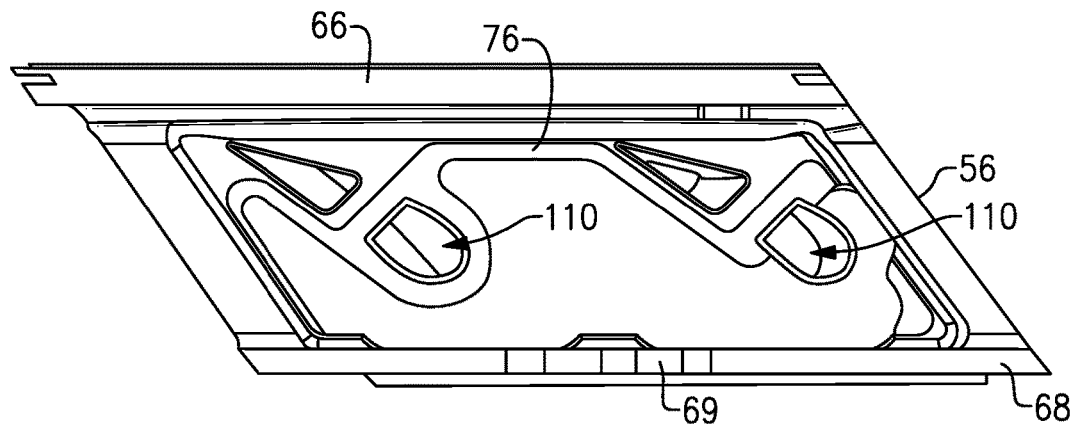
FIG. 4 schematically illustrates a radially outward view of the outer diameter platform of the vane of FIG. 2.
Figure 5:
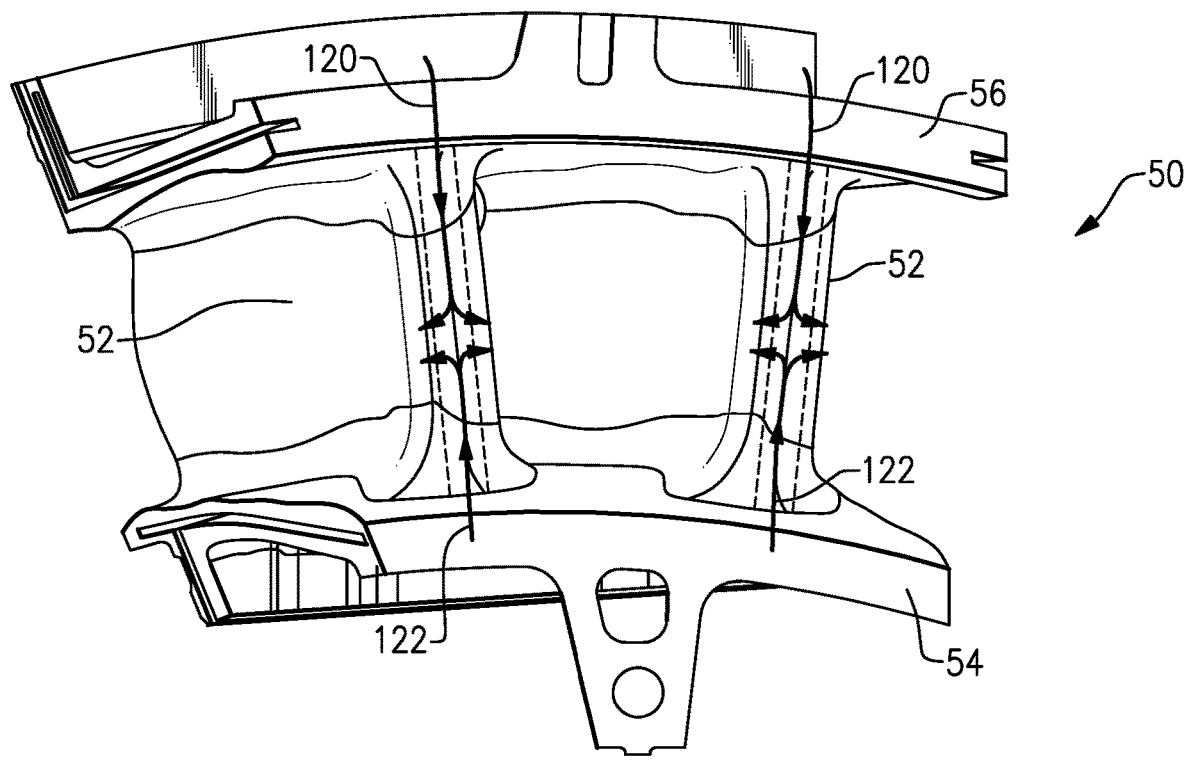
FIG. 5 schematically illustrates the vane of FIG. 2 including highly schematic internal cooling flow passages.

With continued reference to FIGS. 2-3, FIG. 4 schematically illustrates a radially outward view of the outer diameter platform 56 and the cover plate 76. Included within the cover plate 76 are multiple shaped holes 110. The shaped holes 110 allow for the provision of cooling air into the gap 57, and thus into the internal cooling passages of the airfoils 52. Each of the openings 110 has a cross sectional shape aligned with the surface of the outer diameter platform 56. The cross sectional shape of the openings 110 is the same as the cross sectional shape of the corresponding inlets to the internal cooling passages of the airfoils 52. As used herein the "same shape" refers to a shape that has the same relative sizes of each of its own dimensions.

In the exemplary cover 76, the cross section of the openings 110 is scaled down relative to the cross section of the corresponding inlet opening. By scaling down the cross section of the opening 110, an unobstructed flow of cooling gas from the cover opening 110 to the corresponding inlet can be ensured. In some examples, the openings 110 are scaled down by at least 39% relative to the corresponding inlet openings. In alternative examples the magnitude of the scaling can be set to account manufacturing variance, such that a cover opening 110 at the smallest end of the manufacturing variance is at least as large as the corresponding inlet opening at the highest end of the manufacturing variance.

In examples including the baffle plate 77, the baffle plate 77 includes openings 79 that are identical in shape and size to the openings 110 in the cover plate 76 and aligned with the openings 110 in the cover plate 76, such that the flow of air from the opening 110 to the inlet of the internal cooling passage is unobstructed by the baffle plate 77. In one example, the baffle plate 77 openings 79 and the openings 110 are created in a single material removal operation.

With continued reference to FIGS. 1-4, FIG. 5 illustrates an exemplary coolant flow through the internal passages within the vane 50. During operation of the gas turbine engine, cooling air is provided to each airfoil 52 in the vane 50 through the inner diameter platform 54 along a first cooling flow path 122. Simultaneously, cooling air is provided to each airfoil 52 in the vane 50 through the outer diameter platform 56 along a second cooling flowpath 120. As the cooling air travels through the airfoils 52 the cooling air exits the airfoils 52 via multiple film cooling holes (omitted for clarity) allowing the cooling fluid to protect the exterior surface of the airfoils 52. In alternative examples, the cooling fluid can be expelled from the internal cooling passage into the flowpath 70 (See FIG. 3) via any other style opening.

Cooling air entering the airfoils 52 along each of the cooling flowpaths 120, 122 is provided a sufficient counterbalancing pressures capable of preventing inflow of hot gas path air through the film cooling holes of the airfoils 52.

In some examples the structure illustrated in FIG. 2-5 can be a newly manufactured component. In alternative examples, it can be desirable to reoperate an existing vane 50 to add the functionality of providing cooling air through the outer platform 56. In order to reoperate an existing vane 50, the vane 50 is removed from the engine, and remains in a fully assembled state. The openings 110 in the cover 76, as well as in the baffle plate 77 when a baffle plate is included, are then created by using a drilling, electrical discharge machining (EDM), or other material removal process. The material removal process removes only the material at the opening 110, and does not remove additional material from the cover 76 or the baffle plate 77.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vane assembly for a gas turbine engine comprising:
an inner diameter platform;
an outer diameter platform;
an airfoil shaped vane spanning from the inner diameter platform to the outer diameter platform, the airfoil shaped vane including an internal cooling passage having a first inlet at said inner diameter platform and a second inlet at said outer diameter platform; and
an outer diameter platform cover disposed radially outward of the outer diameter platform, relative to a radius of an arc defined by an arc of the outer diameter platform, the outer diameter platform including at least one coolant cover inlet hole, the at least one coolant cover inlet hole being aligned with a corresponding second inlet and a cross sectional shape of the second inlet and a cross sectional shape of the at least one cooling cover inlet hole is the same.

2. The vane assembly of claim 1, further comprising a baffle plate disposed between said outer diameter platform and said outer diameter platform cover.

3. The vane assembly of claim 2, wherein the baffle plate includes at least one baffle plate inlet hole, the at least one baffle plate inlet hole being aligned with a corresponding second inlet and a corresponding coolant cover inlet.

4. The vane assembly of claim 3, wherein the baffle plate inlet hole is identically sized with the corresponding coolant cover inlet.

5. The vane assembly of claim 3, wherein the baffle plate inlet hole is identically shaped with the corresponding coolant cover inlet.

6. The vane assembly of claim 1, further comprising a second vane spanning from the inner diameter platform to the outer diameter platform, the second vane being substantially identical to the airfoil shaped vane.

7. The vane assembly of claim 6, wherein the at least one coolant cover inlet hole includes a first coolant cover inlet corresponding to the second inlet of said airfoil shaped vane, and a second coolant cover inlet corresponding to the second inlet of the second vane.

8. The vane assembly of claim 1, wherein the airfoil shaped vane includes a plurality of film cooling holes configured as coolant outlets for the internal coolant passage.

9. The vane assembly of claim 1, wherein the vane assembly is a first stage turbine vane assembly for a gas turbine engine.

10. A vane assembly for a gas turbine engine comprising:
an inner diameter platform;
an outer diameter platform;
an airfoil shaped vane spanning from the inner diameter platform to the outer diameter platform, the airfoil shaped vane including an internal cooling passage having a first inlet at said inner diameter platform and a second inlet at said outer diameter platform;
an outer diameter platform cover disposed radially outward of the outer diameter platform, relative to a radius of an arc defined by an arc of the outer diameter platform, the outer diameter platform including at least one coolant cover inlet hole, the at least one coolant cover inlet hole being aligned with a corresponding second inlet; and
wherein a cross sectional shape of the second inlet and a cross sectional shape of the at least one cooling cover inlet hole is the same and the cross sectional shape of the at least one cooling cover inlet hole is scaled down relative to the cross sectional shape of the second inlet by a scaling factor.

11. The vane assembly of claim 10, wherein the scaling factor is at least 39%.

12. A method for improving a vane assembly comprising:
creating at least a first coolant cover inlet hole in an outer diameter platform cover of a vane assembly, the first coolant cover inlet hole being aligned with a corresponding first airfoil inlet, and the vane assembly including:
an inner diameter platform;
an outer diameter platform;
an airfoil shaped vane spanning from the inner diameter platform to the outer diameter platform, the airfoil shaped vane including an internal cooling passage having a first inlet at said outer diameter platform and a second inlet at said inner diameter platform;
the outer diameter platform cover being disposed radially outward of the outer diameter platform, relative to a radius of an arc defined by an arc of the outer diameter platform; and
wherein the first cooling cover inlet hole is the same shape as the first airfoil inlet.

13. The method of claim 12, wherein creating the first coolant cover inlet hole in the outer diameter platform cover of the vane assembly further includes creating a first baffle plate inlet hole in a corresponding baffle plate.

14. The method of claim 13, wherein creating the first coolant cover inlet hole and the first baffle plate inlet hole is performed in a single material removal operation.

15. The method of claim 12, further comprising creating a second coolant cover inlet hole in the outer diameter platform cover of the vane assembly, the second coolant cover inlet hole being aligned with the corresponding first airfoil inlet.

16. A method for improving a vane assembly comprising:
creating at least a first coolant cover inlet hole in an outer diameter platform cover of a vane assembly, the first coolant cover inlet hole being aligned with a corresponding first airfoil inlet, and the vane assembly including:
an inner diameter platform;
an outer diameter platform;
an airfoil shaped vane spanning from the inner diameter platform to the outer diameter platform, the airfoil shaped vane including an internal cooling passage having a first inlet at said outer diameter platform and a second inlet at said inner diameter platform;
the outer diameter platform cover being disposed radially outward of the outer diameter platform, relative to a radius of an arc defined by an arc of the outer diameter platform; and
wherein the first cooling cover inlet hole is the same shape as the first airfoil inlet, and wherein a size of the first cooling cover inlet hole is scaled relative to a size of the first airfoil inlet such that the first cooling cover inlet hole is smaller than the first airfoil inlet.

\* \* \* \* \*